United States Patent [19]

Umemura et al.

[11] 3,895,049
[45] July 15, 1975

[54] CATALYST AND PROCESS FOR OXIDATION OR AMMOXIDATION OF OLEFIN MIXTURE

[75] Inventors: Sumio Umemura; Kyoji Ohdan; Yasuo Bando; Terumi Hisayuki, all of Ube, Japan

[73] Assignee: Ube Industries, Ltd., Japan

[22] Filed: Aug. 16, 1973

[21] Appl. No.: 388,918

[30] Foreign Application Priority Data
Aug. 25, 1972 Japan.............................. 47-84444
Feb. 2, 1973 Japan.............................. 48-12885

[52] U.S. Cl. ............. 260/465.3; 252/456; 252/468; 260/604 R; 260/680 E
[51] Int. Cl. ......................................... C07c 121/02
[58] Field of Search ...................... 260/465.3, 680 E

[56] References Cited
FOREIGN PATENTS OR APPLICATIONS
46-13725  4/1971  Japan.............................. 260/465.3
46-15491  4/1971  Japan.............................. 260/465.3

*Primary Examiner*—Joseph P. Brust
*Attorney, Agent, or Firm*—Haseltine, Lake & Waters

[57] ABSTRACT

An improved catalyst for the simultaneous conversion of n-butene and isobutene to 1,3-butadiene and methacrolein or methacrylonitrile, respectively, is provided. The catalyst has a composition corresponding to the empirical formula

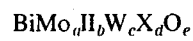
$$BiMo_a II_b W_c X_d O_e$$

wherein II is selected from metals of Group II of the Periodic Table; X is selected from Mn, Cr, Ti, Nb, Ta, Fe, Co and Ni; and $a = 0.1 - 10.0$, $b = 0.05 - 6.0$, $c = 0.05 - 3.0$ and $d = 0 - 5.0$. The catalyst is also used for the oxidation of n-butene to 1,3-butadiene.

5 Claims, No Drawings

CATALYST AND PROCESS FOR OXIDATION OR AMMOXIDATION OF OLEFIN MIXTURE

This invention relates to a catalyst for oxidation or ammoxidation of a hydrocarbon mixture containing n-butene and isobutene, and to a process for simultaneously manufacturing of 1,3-butadiene and methacrolein or methacrylonitrile by the catalytic oxidation or ammoxidation of the above hydrocarbon mixtures, respectively.

In recent years, hydrocarbon mixtures containing predominant amounts of n-butene and isobutene have been produced in large quantities, for example, as the $C_4$ fraction when petroleum naphtha is subjected to catalytic cracking or as the residue, i.e. spent B-B when 1,3-butadiene is extracted from the above $C_4$ fraction.

Such a $C_4$ fraction or spent B-B contains n-butenes such as n-butene-1, cis-n-butene-2 and trans-n-butene-2, isobutene, n-butane and isobutane. Of these $C_4$ hydrocarbons, n-butenes and isobutene are useful as raw materials for the production of 1,3-butadiene and methacrolein or methacrylonitrile, respectively.

However, since these $C_4$ hydrocarbons, i.e. n-butenes, isobutene, n-butane and isobutane resemble each other closely in both physical and chemical properties, it is difficult to extract n-butene or isobutene alone from the $C_4$ hydrocarbon mixture. Therefore, the spent B-B obtained when 1,3-butadiene is extracted from the $C_4$ fraction has ben hitherto used as fuel.

Various catalysts have been heretofore proposed for use in vapor phase catalytic oxidation of n-butene to produce 1,3-butadiene or a vapor phase catalytic oxidation or ammoxidation of isobutene to produce methacrolein or methacrylonitrile, respectively. However, even if such known catalysts useful for the catalytic oxidation or ammoxidation of n-butene or isobutene are used in a vapor phase catalytic oxidation or ammoxidation of a hydrocarbon mixture containing n-butene and isobutene, both the selectivity of n-butene to 1,3-butadiene and the selectivity of isobutene to methacrolein or methacrylonitrile are unsatisfactory. Particularly, the selectivity to 1,3-butadiene is much lower than is the case when n-butene is catalytically oxidized alone.

Several catalysts have been recently proposed for use in vapor phase catalytic oxidation or ammoxidation of a hydrocarbon mixture containing n-butene and isobutene to produce simultaneously 1,3-butadiene and methacrolein or methacrylonitrile, for example, in Japanese Patent Publications No. 7881/1967, No. 43522/1971 and No. 43523/1971 and German Patent Offenlegungschrift No. 2124639. However, with these known catalysts, it has been difficult to obtain both high selectivities to 1,3-butadiene and methacrolein or methacrylonitrile and high conversions of n-butene and isobutene.

It is an object of this invention to provide an improved oxidation or ammoxidation catalyst and process which may enable the simultaneous conversion of n-butene and isobutene to 1,3-butadiene and methacrolein or methacrylonitrile to be effected with enhanced selectivities.

Other objects and advantages will be apparent from the following description including the working examples.

In one aspect of this invention, there is provided a catalyst for the simultaneous conversion of n-butene and isobutene to 1,3-butadiene and methacrolein or methacrylonitrile, respectively, characterized by having a composition corresponding to the empirical formula,

wherein II is at least one metal selected from metals of Group II of the Periodic Table, X is at least one metal selected from manganese, chromium, titanium, niobium, tantalum, iron, cobalt and nickel; and each of $a$, $b$, $c$ and $d$ is a number expressing an atomic ratio of the respective metal to bismuth and falling within the following ranges, $a = 0.1$ to $10.0$, $b = 0.05$ to $6.0$, $= 0.05$ to $3.0$ and $d = 0$ to $5.0$, and $e$ is a number which satisfies the average valency of the metals.

In another aspect of this invention, there is provided a process for the oxidation or ammoxidation of a hydrocarbon mixture containing n-butene and isobutene to simultaneously produce 1,3-butadiene and methacrolein or methacrylonitrile which comprises contacting, in the vapor phase, at an elevated temperature a mixture of said hydrocarbon mixture and oxygen or a mixture of said hydrocarbon mixture, oxygen and ammonia with a catalyst having the particular composition as defined above.

It now has been found that a catalyst having the particular composition as defined above is exceptionally active for the oxidation of n-butene to 1,3-butadiene, and can be advantageously used to produce 1,3-butadiene from n-butene alone. Therefore, in a further aspect of this invention, there is provided a catalyst for the oxidation of n-butene to 1,3-butadiene characterized by having the composition defined above. In a still further aspect of this invention, there is provided a process for the manufacture of 1,3-butadiene from n-butene which comprises contacting, in a vapor phase, at an elevated temperature, a mixture of n-butene and oxygen with a catalyst having the composition defined above.

The catalyst of this invention is characterized by having the composition corresponding to the empirical formula,

In this empirical formula, "II" signifies at least one metal selected from Group II of the Periodic Table. The metal II preferably includes, calcium, barium, zinc, cadmium, strontium, magnesium and mercury. Of these, calcium, barium and zinc are most preferable. "X" signifies at least one metal selected from manganese, chromium, titanium, niobium, tantalum, iron, cobalt and nickel. Atomic ratios of the respective metals to bismuth, which are indicated by $a$, $b$, $c$ and $d$ in the empirical formula are as follows, $a = 0.1$ to $10.0$, preferably $0.5$ to $7.0$,
$b = 0.05$ to $6.0$, preferably $0.1$ to $5.0$,
$c = 0.05$ to $3.0$, preferably $0.1$ to $2.0$, and
$d = 0$ to $5.0$, preferably $0.1$ to $4.0$.

$e$ is a number taken to satisfy the average valency of the metals employed.

These metal ingredients may be present in the catalyst composition either as a mixture of the metal oxides or in a bonded state.

Typical procedures for the manufacture of some of the catalysts will be illustrated.

Bi-Mo-II-W-O catalyst

A stated amount of ammonium paratungstate is dissolved in hot water. A stated amount of calcium nitrate is dissolved in the aqueous solution. Successively, a solution of a stated amount of bismuth nitrate in nitric acid and a solution of a stated amount of ammonium molybdate in aqueous ammonia are added by drops into the above solution at the same time, while the solution is stirred, thereby forming a precipitate. After leaving overnight, the precipitate is washed by repeated decantation, filtered and dried. The dried product is pulverized and shaped into pellets or particles of desired shape and size, and finally calcined. A catalyst which contains zinc substituted for the calcium, may be prepared in a similar manner.

Bi-Mo-II-W-X-O catalyst

Stated amounts of ammonium paratungstate, calcium nitrate and ferric nitrate are dissolved in hot water. A solution of a stated amount of bismuth nitrate in nitric acid and a solution of a stated amount of ammonium molybdate in aqueous ammonia are added by drops into the above solution at the same time, while the solution is stirred, thereby forming a precipitate. The precipitate is treated in a manner similar to that described in the previous example. Other catalysts, which contain manganese, chromium, titanium, niobium, tantalum, cobalt or nickel substituted for the iron, may be prepared in a similar manner.

The procedures for the preparation of the catalyst are not critical. The catalyst may be prepared by procedures other than those illustrated above. Also, the raw materials used for the preparation of the catalyst are not critical.

The catalyst may be used alone or in combination with any of the known carriers. As carriers, those which have a favorable effect on the reaction involved, such as silica, alumina, alumina-silica, silicate, diatomaceous earth and the like which have been deactivated by, e.g. heat-treatment, may suitably be employed. These carriers may be used in an amount of, for example, from 10 to 90 percent by weight of the catalyst.

The catalyst may be employed in either a fluidized bed, a moving bed or a fixed bed, although it is more advantageously used in a fixed bed since the life of the catalyst is extremely long.

Size and configuration of the catalyst grain are not critical but depend primarily on whether the catalyst is used in a fluidized bed or fixed bed. The catalyst may also be shaped or grained by suitable known methods in order to provide required mechanical strength.

The hydrocarbon mixture feed in the oxidation or ammoxidation process of the invention is not critical. Any hydrocarbon mixture may be used provided that it contains both n-butene and isotubene, but in general, a hydrocarbon mixture predominantly containing n-butene and isobutene, such as a $C_4$ fraction obtained when petroleum naphtha is subjected to catalytic cracking and a spent B-B when 1,3-butadiene is extracted from the above $C_4$ fraction are used. The hydrocarbon mixture may contain n-butane, isobutane and other hydrocarbons. However, any gas influencing the oxidation or ammoxidation reaction to any appreciable degree under the particular reaction conditions, for example, $C_5$ or higher olefins, should preferably be excluded from the reaction feed since they may form undesirable by-products and reduce the conversions of n-butene and isobutene.

Likewise, other diluents which do not influence the oxidation or ammoxidation reaction may be present in the reaction mixture without deleterious effect. Such diluents include, for example, steam, nitrogen and carbon dioxide. The amount of diluent in the reaction feed is preferably more than 0.5 moles per mole of the total of n-butene and isobutene. Steam in the reaction mixture not only acts as a diluent but also enhances the selectivity of the catalyst for the formation of 1,3-butadiene and methacrolein or methacrylonitrile and prolongs the activity of the catalyst. Accordingly, it is generally preferred to add at least 0.5 moles of steam to the feed per mole of the total of n-butene and isobutene.

As a source of oxygen for the oxidation or ammoxidation reaction of the invention, pure oxygen or any oxygen-containing gas may be used. Particularly, air may be advantageously used. A relative proportion of oxygen in the feed for the reaction is suitably from 0.4 to 5 moles, and preferably from about 0.5 to about 3.0 moles per mole of the total of n-butene and isobutene. Feeding of oxygen in excess of the above limit inevitably leads to formation of by-products such as carbon monoxide and carbon dioxide. On the other hand, feeding of oxygen less than the above range brings about a reduction of selectivity of the end product.

A relative proportion of ammonia in the feed, used for the ammoxidation reaction of the invention is suitably from 0.5 to 3 moles, and preferably from about 0.8 to 2.0 moles per mole of isobutene contained in the hydrocarbon mixture.

Both the oxidation and the ammoxidation reaction are usually carried out under atmospheric pressure although slightly superatmospheric or slightly reduced pressures may be used if desired.

The reaction is suitably carried out at a temperature ranging between 300°C and 550°C, preferably between 330°C and 500°C. Reaction temperatures exceeding the upper limit tend to cause the decomposition of 1,3-butadiene and methacrolein or methacrylonitrile, reduction of selectivity and promotion of side-reactions.

A contact time of 0.3 to 20 seconds, especially 0.5 to 15 seconds is preferred. A contact time exceeding the upper limit causes the decomposition of the reaction products and other undesirable side-reactions.

The intended products, i.e. 1,3-butadiene and methacrolein or methacrylonitrile can be easily recovered from the reaction product by known procedures such as extraction with solvent and condensation.

The following examples are given to illustrate the invention and are not to be considered as limiting in any sense. In the examples, "percent conversion" and "percent selectivity" are defined as follows:

$$\% \text{ conversion} = \frac{\text{moles of n-butene or isobutene consumed}}{\text{moles of n-butene or isobutene supplied}} \times 100$$

$$\% \text{ selectivity} = \frac{\text{moles of product}}{\text{moles of n-butene or isobutene consumed}} \times 100$$

In Examples 1 through 55-1 and Comparative Examples 1 and 2, a spent B-B when 1,3-butadiene was extracted from $C_4$ fraction obtained when petroleum naphtha was subjected to catalytic cracking, was used as the "hydrocarbon mixture containing n-butene and isobutene." This hydrocarbon mixture had the composition shown in Table I.

Table I

| Ingredient | mole % | Ingredient | mole % |
| --- | --- | --- | --- |
| Propane | 0.1 | Isobutene | 47.0 |
| Propylene | 0.5 | Trans-n-butene-2 | 7.9 |
| Isobutane | 1.5 | Cis-n-butene-2 | 3.6 |
| n-Butane | 8.1 | 1,3-Butadiene | 0.4 |
| N-Butene-1 | 30.4 | Propadiene | 0.5 |

Besides the above-listed ingredients, the hydrocarbon mixture contained trace amounts of mercaptan, methylacetylene, ethylacetylene and vinylacetylene. This hydrocarbon mixture is referred to as "spent B-B" for brevity in the examples.

EXAMPLES 1 - 8

Bi-Mo-Ca-W catalyst (1)

90.6 g of ammonium paratungstate [$(NH_4)_{10}W_{12}O_{41} \cdot 5H_2O$] and 245.6 g of calcium nitrate [$Ca(NO_3)_2 \cdot 4H_2O$] were dissolved in 1 $l$ of water maintained at 60°C, while being stirred. To this solution, were added by drops at the same time, a solution of 168.2 g bismuth nitrate [$Bi(NO_3)_3 \cdot 5H_2O$] in 202 ml of 10 percent nitric acid and a solution of 122.6 g ammonium molybdate [$(NH_4)_6Mo_7O_{24} \cdot 4H_2O$] in 267 ml of 10 percent aqueous ammonia. Successively, 10 percent aqueous ammonia was added to the reaction mixture thereby adjusting the pH to 4.0 to form a precipitate. After leaving overnight, the precipitate was washed by four decantations, filtered and dried. The product was shaped into tablets having a diameter of 5 mm, and then calcined at 600°C for 16 hours to prepare a catalyst.

Using the catalyst so prepared oxidation and ammoxidation reactions were performed by the following procedures.

In Example 1, 8 ml of the catalyst, so prepared, was packed into a U-shaped glass reaction tube having an inner diameter of 10 mm. A gaseous mixture of spent B-B, ammonia, air and steam the molar ratios of the four components being 1 : 1 : 10 : 8, respectively, was passed through the catalyst-packed reaction tube maintained at 430°C at a flow rate of 150 ml/min. The contact time was 3.2 seconds.

In Example 2, the procedure of Example 1 was followed, except that the amount of the catalyst packed into the reaction tube was 10 ml, the reaction temperature was 420°C and the contact time was 4.0 seconds, with all other conditions remaining substantially the same.

In Example 3, the procedure of Example 1 was followed except that the amount of the catalyst packed into the reaction tube was 5 ml, the reaction temperature was 450°C and the contact time was 2 seconds, with all other conditions remaining substantially the same.

In Example 4, 8 ml of the catalyst was packed into a U-shaped glass reaction tube having an inner diameter of 10 mm. A gaseous mixture of spent B-B, air and steam, the molar ratio of the three components being 1 : 10 : 3.5, respectively, was passed through the catalyst-packed reaction tube maintained at 430°C at a flow rate of 145 ml/min. The contact time was 3.3 seconds.

In Example 5, the procedure of Example 1 was followed except that the molar ratios of the spent B-B, ammonia, air and steam were 1 : 1 : 10 : 3, respectively, the flow rate was 75 ml/min, the reaction temperature was 400°C and the contact time was 6.4 seconds, with all other conditions remaining substantially the same.

In Examples 6, 7 and 8, the procedure of Example 1 was followed except that catalysts containing the four metal ingredients in varied atomic ratios were employed with all other conditions remaining substantially the same.

The results are shown in Table II.

EXAMPLE 9

Bi-Mo-Ca-W catalyst (2)

90.6 g of ammonium paratungstate [$(NH_4)_{10}W_{12}O_{41} \cdot 5H_2O$] and 122.8 g of calcium nitrate [$Ca(NO_3)_2 \cdot 4H_2O$] were dissolved in 1 $l$ of hot water. To the solution were added 168.2 g of bismuth nitrate [$Bi(NO_3)_3 \cdot 5H_2O$] and 112.6 g of ammonium molybdate [$(NH_4)_6Mo_7O_{24} \cdot 4H_2O$] at the same time while the solution was vigorously stirred. The slurry so obtained was heated to dryness in a sand bath until generation of $NO_2$ gas ceased. 1.5 percent of graphite was added to the product. The mixture was then shaped into tablets having a diameter of 5 mm. The tablets were calcined at 600°C for 10 hours to prepare a catalyst.

Using the catalyst, ammoxidation reaction was performed by the same procedure as that of Example 1. The results are shown in Table II.

COMPARATIVE EXAMPLE 1

Bi-Mo catalyst 298 ml of a solution of 650 g bismuth nitrate [$Bi(NO_3)_3 \cdot 5H_2O$] in 1 $l$ of a 10 percent nitric acid and 187 ml of a solution of 374 g of ammonium molybdate [$(NH_4)_6Mo_7O_{24} \cdot 4H_2O$] in 1 $l$ of a 10 percent aqueous ammonia were added by drops at the same time to 1 $l$ of water while the pH was maintained at 4.0 to form a precipitate. The precipitate so formed was treated in the same manner as that of Example 1 to prepare a catalyst. The catalyst was substantially composed of [$Bi_2O_3 \cdot 2MoO_3$].

Using the catalyst so prepared, the ammoxidation reaction was performed by the same procedure as that of Example 1. The results are shown in Table II.

Table II

| Example No. | Catalyst | Atomic ratio | Conversion (%) | | Selectivity (%) | |
| --- | --- | --- | --- | --- | --- | --- |
| | | | n-butenes | Iso-butene | 1,3-butadiene | MAN *1 |
| 1 | Bi-Mo-Ca-W | 1:2:3:1 | 87.2 | 89.1 | 81.4 | 87.0 |
| 2 | " | " | 86.3 | 96.0 | 83.3 | 85.4 |
| 3 | " | " | 87.3 | 94.2 | 80.0 | 87.4 |
| 4 | " | " | 88.6 | 91.2 | 80.5 | (MA) *2 89.2 |
| 5 | " | " | 89.6 | 92.6 | 84.6 | 85.2 |
| 6 | " | 2:2:6:1 | 89.3 | 93.2 | 85.3 | 87.3 |
| 7 | " | 2:1:4:2 | 87.4 | 94.5 | 84.1 | 86.5 |
| 8 | " | 1:2:2:1 | 88.0 | 92.4 | 83.7 | 87.7 |
| 9 | " | 1:2:1.5:1 | 84.2 | 91.2 | 81.6 | 85.2 |

Table II—Continued

| Example No. | Catalyst | Atomic ratio | Conversion (%) n-butenes | Iso-butene | 1,3-butadiene | Selectivity (%) MAN *1 |
|---|---|---|---|---|---|---|
| Comparative 1 | Bi-Mo | 1:1 | 43.6 | 74.7 | 22.5 | 78.1 |

*1 MAN. Methacrylonitrile
*2 MA. Methacrolein

EXAMPLES 10 - 17

Bi-Mo-Zn-W catalyst (1)

90.6 g of ammonium paratungstate [$(NH_4)_{10}W_{12}O_{41}\cdot 5H_2O$] and 309 g of zinc nitrate [$Zn(NO_3)_2\cdot 6H_2O$] were dissolved in 1 l of water maintained at 60°C, while being stirred. To this solution there were added by drops at the same time a solution of 168.2 g bismuth nitrate [$Bi(NO_3)_3\cdot 5H_2O$] in 202 ml of 10 percent nitric acid and a solution of 122.6 g ammonium molybdate [$(NH_4)_6Mo_7O_{24}\cdot 4H_2O$] in 267 ml of 10 percent aqueous ammonia. 10 percent aqueous ammonia was then added to the reaction mixture to adjust the pH to 4.0 to form a precipitate. After leaving overnight, the precipitate was washed by four decantations, filtered and dried. The dried product was shaped into tablets and then calcined at 600°C for 16 hours to prepare a catalyst.

Using the catalyst so prepared, oxidation and ammoxidation reactions were performed by the following procedures.

In Examples 10, 11, 12, 13 and 14, the procedures of Examples 1, 2, 3, 4 and 5 were followed, respectively, with all conditions remaining substantially the same.

In Examples 15, 16 and 17, the procedure of Example 10 was followed wherein catalysts containing the four metal ingredients in varied atomic ratios were employed with all other conditions remaining substantially the same.

The results are shown in Table III.

EXAMPLE 18

Bi-Mo-Zn-W catalyst (2)

90.6 g of ammonium paratungstate [$(NH_4)_{10}W_{12}O_{41}\cdot 5H_2O$] and 155 g of zinc nitrate [$Zn(NO_3)_2\cdot 6H_2O$] were dissolved in 1 l of hot water. To the solution were added 168.2 g of bismuth nitrate [$Bi(NO_3)_3\cdot 5H_2O$] and 112.6 g of ammonium molybdate [$(NH_4)_6Mo_7O_{24}\cdot 4H_2O$] at the same time while the solution was vigorously stirred. The slurry so obtained was heated to dryness in a sand bath until generation of $NO_2$ gas ceased. To the product was added 1.5 percent of graphite. The mixture was then shaped into tablets having a diameter of 5 mm. The tablets were calcined at 600°C for 10 hours to prepare a catalyst.

Using the catalyst, the ammoxidation reaction was performed by the same procedure as that of Example 10. The results are shown in Table III.

EXAMPLES 10-1 - 10-3

Bi-Mo-Mg, Ba or Cd-W catalyst

The procedure for the preparation of catalyst in Example 10 was followed except that, in substitution for 309 g of zinc nitrate [$Zn(NO_3)_2\cdot 6H_2O$] used in Example 10, 266.0 g of magnesium nitrate [$Mg(NO_3)_2\cdot 6H_2O$], 269 g of barium nitrate [$Ba(NO_3)_2$] and 319 g of cadmium nitrate [$Cd(NO_3)_2\cdot 4H_2O$] were used separately in Examples 10-1, 10-2 and 10-3, respectively, with all other conditions remaining substantially the same.

Using the catalysts so prepared, ammoxidation was performed by the procedure of Example 10. The results are shown in Table III.

Table III

| Example No. | Catalyst | Atomic ratio | Conversion (%) n-butenes | Iso-butene | 1,3-butadiene | Selectivity (%) MAN |
|---|---|---|---|---|---|---|
| 10 | Bi-Mo-Zn-W | 1:2:3:1 | 89.9 | 90.1 | 80.7 | 86.5 |
| 11 | '' | '' | 89.0 | 97.4 | 82.5 | 84.9 |
| 12 | '' | '' | 90.0 | 95.1 | 80.1 | 87.0 |
| 13 | '' | '' | 91.3 | 92.3 | 80.5 | 88.8 (MA) |
| 14 | '' | '' | 92.3 | 93.8 | 83.1 | 87.6 |
| 15 | '' | 2:2:6:1 | 92.0 | 94.3 | 83.9 | 87.6 |
| 16 | '' | 2:1:4:2 | 92.1 | 95.7 | 82.9 | 86.0 |
| 17 | '' | 1:2:2:1 | 90.7 | 93.5 | 82.7 | 87.3 |
| 18 | '' | 1:2:1.5:1 | 86.9 | 92.2 | 81.0 | 84.9 |
| 10-1 | Bi-Mo-Mg-W | 1:2:3:1 | 87.2 | 89.6 | 81.6 | 87.2 |
| 10-2 | Bi-Mo-Ba-W | 1:2:3:1 | 88.3 | 89.7 | 82.0 | 86.4 |
| 10-3 | Bi-Mo-Cd-W | '' | 89.8 | 90.0 | 81.3 | 87.2 |

EXAMPLES 19 - 24

Bi-Mo-Ca-W-Nb catalyst (1)

74.1 g of ammonium paratungstate [$(NH_4)_{10}W_{12}O_{41}\cdot 5H_2O$], 9.4 g of niobium pentaoxide [$Nb_2O_5$] and 251.3 g of calcium nitrate [$Ca(NO_3)_2\cdot 4H_2O$] were dissolved in 1 l of water maintained at 60°C, while being stirred. To this solution, were added by drops at the same time a solution of 172.2 g bismuth nitrate [$Bi(NO_3)_3\cdot 5H_2O$] in 207 ml of a 10 percent nitric acid and a solution of 125.5 g ammonium molybdate [$(NH_4)_6Mo_7O_{24}\cdot 4H_2O$] in 298 ml of 10 percent aqueous ammonia. 10 percent aqueous ammonia was then added to the reaction mixture to adjust the pH to 4.0. The precipitate so formed was treated in the same manner as that of Example 1 to prepare a catalyst.

Using the catalyst so prepared, oxidation and ammoxidation reactions were performed by the following procedures.

In Example 19, the catalyst was pulverized to particles of 16 to 24 mesh (Tyler standard sieve). 4 ml of the particles were blended with 3 ml of an alumina carrier in the form of particles of 16 to 24 mesh (Tyler standard sieve). The blend was packed into a U-shaped glass reaction tube having an inner diameter of 7 mm. A gaseous mixture of spent B-B, ammonia, air and steam, the ratios by volume of the four components being 1 : 10 : 1 : 3, respectively, was passed through the catalyst-packed reaction tube maintained at 400°C at a flow rate of 100 ml/min. The contact time was 2.4 seconds.

In Example 20, the procedure of Example 19 was followed except that the amount of the catalyst packed into the reaction tube was 3 ml, the reaction temperature was 430°C and the contact time was 1.8 seconds, with all other conditions remaining substantially the same.

In Example 21, 4 ml of the catalyst prepared in Example 19 was packed into a reaction tube exactly similar to that used in Example 19. A gaseous mixture of spent B-B, air and steam, the ratios by volume of the three components being 1 : 10 : 3.5, respectively, was passed through the catalyst packed reaction tube maintained at 400°C.

In Examples 22, 23 and 24 the procedure of Example 19 was followed except that catalysts containing the five metal ingredients in varied atomic ratios were employed with all other conditions remaining substantially the same.

The results are shown in Table IV.

EXAMPLE 25

Bi-Mo-Ca-W-Nb catalyst (2)

74.1 g of ammonium paratungstate $[(NH_4)_{10}W_{12}O_{41}\cdot 5H_2O]$, 9.4 g of niobium pentaoxide $[Nb_2O_5]$ and 125.7 g of calcium nitrate $[Ca(NO_3)_2\cdot 4H_2O]$ were dissolved in 1 l of hot water. To the solution were added 172.2 g of bismuth nitrate $[Bi(NO_3)_3\cdot 5H_2O]$ and 125.5 g of ammonium molybdate $[(NH_4)_6Mo_7O_{24}\cdot 4H_2O]$ at the same time while being vigorously stirred. The slurry so obtained was heated to dryness in a sand bath until generation of $NO_2$ gas ceased. From this dried product, a tabletted catalyst was prepared in the same manner as that of Example 9.

Using the catalyst so prepared, ammoxidation reaction was performed by the same procedure as that of Example 19. The results are shown in Table IV.

EXAMPLES 26 – 31

Bi-Mo-Ca-W-Ti catalyst (1)

75.1 g of ammonium paratungstate $[(NH_4)_{10}W_{12}O_{41}\cdot 5H_2O]$, 5.75 g of titanium dioxide $[TiO_2]$ and 254.5 g of calcium nitrate $[Ca(NO_3)_2\cdot 4H_2O]$ were dissolved in 1 l of water maintained at 60°C while being stirred. To this solution, were added by drops at the same time a solution of 174.4 g of bismuth nitrate $[Bi(NO_3)_3\cdot 5H_2O]$ in 210 ml of 10 percent nitric acid and a solution of 127.1 g of ammonium molybdate $[(NH_4)_6Mo_7O_{24}\cdot 4H_2O]$ in 301 ml of 10 percent aqueous ammonia. 10 percent aqueous ammonia was then added to the reaction mixture to adjust the pH to 4.0 to form a precipitate. The precipitate was treated in the same manner as that of Example 1 to prepare a catalyst.

In Example 26, using the catalyst so prepared, ammoxidation reaction was performed by the same procedure as that of Example 19.

In Example 27, the procedure of Example 26 was followed except that the amount of the catalyst packed into the reaction tube was 6 ml, the reaction temperature was 390°C and the contact time was 3.6 seconds, with all other conditions remaining substantially the same.

In Example 28, 3 ml of the catalyst prepared in Example 26 was packed into a reaction tube exactly similar to that used in Example 19. A gaseous mixture of spent B-B, air and steam, the ratio by volume of the three components being 1 : 10 : 3.5, respectively, was passed through the catalyst-packed reaction tube maintained at 420°C at a flow rate of 95 ml/min.

In Examples 29, 30 and 31, the procedure of Example 19 was followed except that catalysts containing the five metal ingredients in varied atomic ratios were employed, with all other conditions remaining substantially the same. The results of Examples 26 – 31 are shown in Table IV.

EXAMPLE 32

Bi-Mo-Ca-W-Ti catalyst (2)

A catalyst was prepared from the following compounds by the same procedure as that of Example 25.

| | |
|---|---|
| Ammonium paratungstate $[(NH_4)_{10}W_{12}O_{41}\cdot 5H_2O]$ | 75.1 g |
| Titanium dioxide $[TiO_2]$ | 5.75 g |
| Calcium nitrate $[Ca(NO_3)_2\cdot 4H_2O]$ | 127.3 g |
| Bismuth nitrate $[Bi(NO_3)_3\cdot 5H_2O]$ | 174.4 g |
| Ammonium molybdate $[(NH_4)_6Mo_7O_{24}\cdot 4H_2O]$ | 127.1 g |

Using the catalyst so prepared, ammoxidation was performed by the procedure of Example 19 with all conditions remaining substantially the same. The results are shown in Table IV.

EXAMPLES 33 – 37

Bi-Mo-Ca-W-Ta catalyst 72.6 g of ammonium paratungstate $[(NH_4)_{10}W_{12}O_{41}\cdot 5H_2O]$, 15.4 g of tantalum pentaoxide $[Ta_2O_5]$ and 246.2 g of calcium nitrate $[Ca(NO_3)_2\cdot 4H_2O]$ were dissolved in 1 l of water maintained at 60°C, while being stirred. To the solution, were added by drops at the same time a solution of 168.7 g bismuth nitrate $[Bi(NO_3)_3\cdot 5H_2O]$ in 203 ml of a 10 percent nitric acid and a solution of 122.9 g ammonium molybdate $[(NH_4)_6Mo_7O_{24}\cdot 4H_2O]$ in 291 ml of 10 percent aqueous ammonia. 10 percent aqueous ammonia was then added to the reaction mixture to adjust the pH to 4.0 to form a precipitate. The precipitate was treated in the same manner as that of Example 1 to prepare a catalyst.

In Example 33, using the catalyst so prepared, ammoxidation was performed by the procedure of Example 19.

In Example 34, the procedure of Example 21 was followed except that the above catalyst was used in an amount of 3 ml and the reaction temperature was 420°C with all other conditions remaining substantially the same.

In Examples 35, 36 and 37, the procedure of Example 33 was followed except that catalysts containing the five metal ingredients in varied atomic ratios were employed, with all other conditions remaining substantially the same. The results of Examples 33 – 37 are shown in Table IV.

251.9 g of calcium nitrate [$Ca(NO_3)_2 \cdot 4H_2O$], 317.5 g of zinc nitrate [$Zn(NO_3)_2 \cdot 6H_2O$], 262.4 g of barium nitrate [$Ba(NO_3)_2$] and 273.7 g of magnesium nitrate [$Mg(NO_3)_2 \cdot 6H_2O$] were used separately in Examples 43, 43–1 and 43–2, respectively, with all other conditions remaining substantially the same.

Table IV

| Example No. | Catalyst | Atomic ratio | Conversion (%) n-Butene | Conversion (%) Iso-butene | Selectivity (%) 1,3-Butadiene | Selectivity (%) MAN |
|---|---|---|---|---|---|---|
| 19 | Bi-Mo-Ca-W-Nb | 1:2:3:0:8:0.2 | 94.6 | 96.3 | 84.1 | 84.4 |
| 20 | " | " | 92.3 | 94.2 | 82.6 | 81.9 |
| 21 | " | " | 93.4 | 96.1 | 85.7 | 85.2 (MA) |
| 22 | " | 1:2:3:0.5:0.5 | 91.4 | 93.5 | 81.2 | 82.6 |
| 23 | " | 1:1.8:6:0.3:0.7 | 92.6 | 92.0 | 83.3 | 83.5 |
| 24 | " | 1:1.8:6:0.9:0.1 | 90.5 | 91.4 | 82.1 | 81.9 |
| 25 | " | 1:2:3:0.8:0.2 | 95.4 | 97.6 | 85.2 | 83.0 |
| 26 | Bi-Mo-Ca-W-Ti | " | 96.5 | 96.7 | 84.4 | 84.1 |
| 27 | " | " | 94.2 | 96.1 | 83.2 | 82.9 |
| 28 | " | " | 92.4 | 96.5 | 84.8 | 84.6 (MA) |
| 29 | " | 1:2:3:0.5:0.5 | 94.1 | 94.2 | 83.2 | 82.2 |
| 30 | " | 1:1.8:6:0.3:0.7 | 92.4 | 92.3 | 84.6 | 82.0 |
| 31 | " | 1:1.8:6:0.9:0.1 | 93.3 | 96.6 | 83.5 | 83.1 |
| 32 | " | 1:2:1.5:0.8:0.2 | 96.3 | 94.2 | 81.4 | 83.2 |
| 33 | Bi-Mo-Ca-W-Ta | 1:2:3:0.8:0.2 | 97.6 | 98.6 | 85.6 | 84.9 |
| 34 | " | " | 93.6 | 94.5 | 82.5 | 83.3 (MA) |
| 35 | " | 1:2:3:0.5:0.5 | 94.8 | 96.4 | 81.6 | 84.0 |
| 36 | Bi-Mo-Ca-W-Ta | 1:1.8:6:0.3:0.7 | 93.7 | 94.5 | 82.0 | 83.8 |
| 37 | " | 1:1.8:6:0.9:0.1 | 92.5 | 92.9 | 82.3 | 83.0 |

EXAMPLES 38 –42

Bi-Mo-Ca-W-Mn catalyst 74.3 g of ammonium paratungstate [$(NH_4)_{10}W_{12}O_{41} \cdot 5H_2O$], 19.0 g of manganese nitrate [$Mn(NO_3)_2 \cdot 6H_2O$] and 251.9 g of calcium nitrate [$Ca(NO_3)_2 \cdot 4H_2O$] were dissolved in 1 l of water maintained at 60°C, while being stirred. To this solution were added by drops at the same time a solution of 172.6 g bismuth nitrate [$Bi(NO_3)_3 \cdot 5H_2O$] in 207 ml of 10 percent nitric acid and a solution of 125.8 g ammonium molybdate [$(NH_4)_6Mo_7O_{24} \cdot 4H_2O$] in 298 ml of 10 percent aqueous ammonia. 10 percent aqueous ammonia was then added to adjust the pH to 4.0 to form a precipitate. The precipitate was treated in the same manner as that of Example 1 to prepare a catalyst.

In Example 38, using the catalyst so prepared, ammoxidation reaction was performed by the procedure of Example 19.

In Example 39, the procedure of Example 21 was followed except that the above catalyst was used in an amount of 3 ml and the reaction temperature was 420°C, with all other conditions remaining substantially the same.

In Examples 40, 41 and 42 the procedure of Example 38 was followed except that catalysts containing the five metal ingredients in varied atomic ratios were employed, with all other conditions remaining substantially the same.

The results of Examples 34 – 42 are shown in Table V.

EXAMPLES 43, 43–1 and 43–2

Bi-Mo-Zn, Ba or Mg-W-Mn catalyst

The procedure for the preparation of catalyst in Example 38 was followed except that in substitution for Using the catalysts so prepared, ammoxidation was performed by the procedure of Example 19. The results are shown in Table V.

EXAMPLES 44 and 45

Bi-Mo-Zn-W-Fe catalyst 61.9 g of ammonium paratungstate [$(NH_4)_{10}W_{12}O_{41} \cdot 5H_2O$], 23.9 g of ferric nitrate [$Fe(NO_3)_3 \cdot 9H_2O$] and 262.3 g of zinc nitrate [$Zn(NO_3)_2 \cdot 6H_2O$] were dissolved in 1 l of water maintained at 60°C, while being stirred. To this solution were added by drops at the same time a solution of 143.7 g bismuth nitrate [$Bi(NO_3)_3 \cdot 5H_2O$] in 210 ml of a 10 percent nitric acid and a solution of 104.6 g ammonium molybdate [$(NH_4)_6Mo_7O_{24} \cdot 4H_2O$] in 281 ml of 10 percent aqueous ammonia. 10 percent aqueous ammonia was then added to adjust the pH to 4.0 to form a precipitate. The precipitate was treated in the same manner as that of Example 1 to prepare a catalyst.

In Example 44, using the catalyst so prepared, ammoxidation was performed by the procedure of Example 19.

In Example 45, the procedure of Example 21 was followed except that the above catalyst was used in an amount of 3 ml, with all other conditions remaining substantially the same. The results of Examples 44 and 45 are shown in Table V.

EXAMPLE 46

Bi-Mo-Ca-W-Fe catalyst

The procedure for the preparation of catalyst in Example 44 was followed except that 209.8 g of calcium nitrate [$Ca(NO_3)_2 \cdot 4H_2O$] was used in substitution for 262.3 g of zinc nitrate [$Zn(NO_3)_2 \cdot 6H_2O$], with all other conditions remaining substantially the same.

Using the catalyst so prepared, ammoxidation reaction was performed by the procedure of Example 19. The results are shown in Table V.

EXAMPLES 47 and 48

Bi-Mo-Zn-W-Co catalyst 72.4 g of ammonium paratungstate $[(NH_4)_{10}W_{12}O_{41}.5H_2O]$, 17.9 g of cobalt nitrate $[Co(NO_3)_2.6H_2O]$ and 281.3 g of zinc nitrate $[Zn(NO_3)_2.6H_2O]$ were dissolved in 1 l of water maintained at 60°C. To this solution were added by drops at the same time a solution of 162.4 g bismuth nitrate $[Bi(NO_3)_3.5H_2O]$ in 207 ml of 10 percent nitric acid and a solution of 123.4 g ammonium molybdate $[(NH_4)_6Mo_7O_{24}.4H_2O]$ in 296.4 ml of 10 percent aqueous ammonia. 10 percent aqueous ammonia was then added to adjust the pH to 4.0 to form a precipitate. The precipitate was treated in the same manner as that of Example 1 to prepare a catalyst.

In Example 47, using 3 ml of the catalyst so prepared, ammoxidation reaction was performed by the procedure of Example 19.

In Example 48, the procedure of Example 21 was followed except that the above catalyst was used in an amount of 3 ml with all other conditions remaining substantially the same. The results of Examples 47 and 48 are shown in Table V.

EXAMPLE 49

Bi-Mo-Ca-W-Co catalyst

The procedure for the preparation of catalyst of Example 47 was followed except that 224 g of calcium nitrate $[Ca(NO_3)_2.4H_2O]$ was used in substitution for 281.3 g of zinc nitrate $[Zn(NO_3)_2.6H_2O]$ all other conditions remaining substantially the same.

Using the catalyst so prepared, ammoxidation was performed by the same procedure as that of Example 19. The results are shown in Table V.

EXAMPLE 50

Bi-Mo-Zn-W-Ni catalyst (1)

69.6 g of ammonium paratungstate $[(NH_4)_{10}W_{12}O_{41}.5H_2O]$, 297.5 g of zinc nitrate $[Zn(NO_3)_2.6H_2O]$ and 19.4 g of nickel nitrate $[Ni(NO_3)_2.6H_2O]$ were dissolved in 1 l of water maintained at 60°C, while being stirred. To this solution, there were added by drops at the same time a solution of 161.7 g bismuth nitrate $[Bi(NO_3)_3.5H_2O]$ in 225 ml of a 10 percent nitric acid and a solution of 123.4 g ammonium molybdate $[(NH_4)_6Mo_7O_{24}.4H_2O]$ in 296 ml of a 10 percent aqueous ammonia. 10 percent aqueous ammonia was then added to adjust the pH to 4.0 to form a precipitate. The precipitate was treated in the same manner as that of Example 1 to prepare a catalyst.

Using the catalyst so prepared, ammoxidation reaction was performed by the procedure of Example 19. The results are shown in Table V.

EXAMPLE 51

Bi-Mo-W-Ca-Ni catalyst

The procedure for the preparation of catalyst in Example 50 was followed except that 236 g of calcium nitrate $[Ca(NO_3)_2.4H_2O]$ was used in substitution for 273.9 g of zinc nitrate $[Zn(NO_3)_2.6H_2O]$ with all other conditions remaining substantially the same.

Using the catalyst so prepared, ammoxidation reaction was performed by the procedure of Example 19. The results are shown in Table V.

EXAMPLE 52

Bi-Mo-Zn-W-Ni catalyst (2)

69.6 g of ammonium paratungstate $[(NH_4)_{10}W_{12}O_{41}.5H_2O]$, 19.4 g of nickel nitrate $[Ni(NO_3)_2.6H_2O]$ and 297.5 g of zinc nitrate $[Zn(NO_3)_2.6H_2O]$ were dissolved in 1 l of hot water. To this solution there were added at the same time 161.7 g of bitmush nitrate $[Bi(NO_3)_3.5H_2O]$ and 123.4 g of ammonium molybdate $[(NH_4)_6Mo_7O_{24}.4H_2O]$ while being vigorously stirred. The slurry so obtained was heated to dryness in a sand bath until generation of $NO_2$ gas ceased. 1.5 percent of graphite was added to the dried product. The mixture was then shaped into tablets having a diameter of 5 mm. The tablets were calcined at 600°C for 10 hours to prepare a catalyst.

Using 3 ml of the catalyst so prepared, ammoxidation was performed by the procedure of Example 19. The results are shown in Table V.

EXAMPLE 53

Bi-Mo-Zn-W-Cr catalyst 74.8 g of ammonium paratungstate $[(NH_4)_{10}W_{12}O_{41}.5H_2O]$, 26.0 g of chromium nitrate $[Cr(NO_3)_3.9H_2O]$ and 302.6 g of zinc nitrate $[Zn(NO_3)_2.6H_2O]$ were dissolved in 1 l of water maintained at 60°C, while being stirred. To this solution there were added by drops at the same time a solution of 164.5 g bismuth nitrate $[Bi(NO_3)_3.5H_2O]$ in 215 ml of 10 percent nitric acid and a solution of 119.7 g of ammonium molybdate $[(NH_4)_6Mo_7O_{24}.4H_2O]$ in 303 ml of 10 percent aqueous ammonia. 10 percent aqueous ammonia was then added to adjust the pH to 4.0 to form a precipitate. The precipitate was treated in the same manner as that of Example 1 to prepare a catalyst.

Using 3 ml of the catalyst so prepared, ammoxidation was performed by the procedure of Example 19. The results are shown in Table V.

EXAMPLES 54, 54-1, 54-2 AND 54-3

Bi-Mo-Ca, Ba, Mg or Cd-W-Cr catalyst

The procedure for the preparation of catalyst in Example 53 was followed except that in substitution for 302.6 g of $[Zn(NO_3)_2.6H_2O]$ used in Example 53, 240.2 g of calcium nitrate $[Ca(NO_3)_2.4H_2O]$, 265.9 g of barium nitrate $[Ba(NO_3)_2]$, 260.8 g of magnesium nitrate $[Mg(NO_3)_2.6H_2O]$ and 313.8 g of cadmium nitrate $[Ca(NO_3)_2.6H_2O]$ were used separately in Examples 54, 54-1, 54-2 and 54-3, respectively, with all other conditions remaining substantially the same.

Using the catalysts so prepared, ammoxidation reaction was performed by the same procedure as that of Example 19. The results are shown in Table V.

EXAMPLE 55

Bi-Mo-Zn-W-Nb catalyst

The procedure for the preparation of the catalyst in Example 19 was followed except that 259 g of zinc nitrate $[Zn(NO_3)_2.6H_2O]$ was used in substitution for 251.3 g of calcium nitrate $[Ca(NO_3)_2.4H_2O]$ with all other conditions remaining substantially the same.

Using the catalyst so prepared, ammoxidation was performed by the procedure of Example 19. The results are shown in Table V.

EXAMPLE 55-1

Bi-Mo-Ca-W-Ti-Co-Fe catalyst 223.0 g of ammonium molybdate [$(NH_4)_6Mo_7O_{24} \cdot 4H_2O$] and 14.6 g of ammonium paratungstate [$(NH_4)_{10}W_{12}O_{41} \cdot 5H_2O$] were dissolved in 450 ml of distilled water maintained at 80°C. 2.88 g of titanium oxide [$TiO_2$] was added to the solution, 183.8 g of cobalt nitrate [$Co(NO_3)_2 \cdot 6H_2O$], 51.0 g of ferric nitrate [$Fe(NO_3)_3 \cdot 9H_2O$] and 8.78 g of calcium nitrate [$Ca(NO_3)_2 \cdot 4H_2O$] were dissolved in 150 ml of distilled water. 87.6 g of bismuth nitrate [$Bi(NO_3)_3 \cdot 5H_2O$] were dissolved in a mixture of 90 ml of distilled water and 18 ml of concentrated nitric acid. The above two nitrate solutions were mixed together and then added by drops to the ammonium salt solution containing titanium oxide, mentioned above while being stirred. The slurry so obtained was heated to dryness in a sand bath. The dried product was shaped into tablets. The tablets were heated at a rate of 20°C/hr up to 470°C and then calcined at that temperature for 16 hours to prepare a catalyst.

Using the catalyst so prepared, ammoxidation reaction was performed by the procedure of Example 19. The results are shown in Table V.

COMPARATIVE EXAMPLE 2

Bi-Mo-Sb catalyst 169 g of antimony trichloride ($SbCl_3$) was dissolved in a small quantity of dilute hydrochloric acid, followed by the addition of 1 l of water to effect hydrolysis. After the completion of hydrolysis by the addition of 250 ml of a 10 percent aqueous ammonia, the precipitate so produced was filtered and washed to obtain a paste of antimony oxide. The paste and 49.7 g of ammonium molybdate [$(NH_4)_6Mo_7O_{24} \cdot 4H_2O$] were kneaded together with a small amount of water, followed by heating under agitation. To the resultant paste, was added 101.3 g of bismuth nitrate [$Bi(NO_3)_3 \cdot 5H_2O$] dissolved in a mixture of 15.9 ml of 60 percent nitric acid and 40 ml of water. The slurry so obtained was heated to dryness until generation of $NO_2$ gas ceased. The solid was pulverized and dressed to five particles of 14 to 20 mesh (Tyler standard sieve), and then calcined at 540°C for 18 hours to prepare a catalyst. It was found that the catalyst was predominantly composed of bismuth molybdate and bismuth antimonate.

Using 6 ml of the catalyst so prepared, ammoxidation was performed by the procedure of Example 19. The results are shown in Table V.

Table V

| Example No. | Catalyst | Atomic ratio | Conversion (%) n-Butenes | Iso-butene | Selectivity % 1,3-Butadiene | MAN |
|---|---|---|---|---|---|---|
| 38 | Bi-Mo-Ca-W-Mn | 1:2:3:0.8:0.2 | 95.0 | 96.6 | 81.6 | 84.4 |
| 39 | " | 1:2:3:0.8:0.2 | 97.7 | 94.8 | 86.0 | 87.1 (MA) |
| 40 | " | 1:2:3:0.5:0.5 | 95.4 | 96.3 | 82.2 | 84.5 |
| 41 | " | 1:1.8:6:0.3:0.7 | 93.0 | 95.1 | 81.6 | 86.7 |
| 42 | " | 1:1.8:6:0.9:0.1 | 96.2 | 96.1 | 83.4 | 88.1 |
| 43 | Bi-Mo-Zn-W-Mn | 1:2:3:0.8:0.2 | 96.6 | 95.3 | 86.3 | 88.7 |
| 43-1 | Bi-Mo-Ba-W-Mn | 1:2:3:0.8:0.2 | 92.6 | 93.9 | 84.5 | 87.2 |
| 43-2 | Bi-Mo-Mg-W-Mn | 1:2:3:0.8:0.2 | 91.8 | 93.6 | 85.1 | 88.1 |
| 44 | Bi-Mo-Zn-W-Fe | 1:2:3:0.8:0.2 | 94.7 | 95.6 | 82.0 | 86.0 |
| 45 | " | 1:2:3:0.8:0.2 | 93.9 | 94.4 | 83.3 | 85.5 (MA) |
| 46 | Bi-Mo-Ca-W-Fe | 1:2:3:0.8:0.2 | 93.6 | 95.6 | 85.3 | 84.6 |
| 47 | Bi-Mo-Zn-W-Co | 1:2:3:0.8:0.2 | 91.6 | 92.0 | 82.6 | 84.1 |
| 48 | " | 1:2:3:0.8:0.2 | 93.2 | 93.6 | 82.1 | 84.8 (MA) |
| 49 | Bi-Mo-Ca-W-Co | 1:2:3:0.8:0.2 | 93.3 | 95.1 | 84.1 | 86.4 |
| 50 | Bi-Mo-Zn-W-Ni | 1:2:3:0.8:0.2 | 93.1 | 94.4 | 85.6 | 85.9 |
| 51 | Bi-Mo-Ca-W-Ni | 1:2:3:0.8:0.2 | 94.6 | 95.1 | 84.6 | 87.2 |
| 52 | Bi-Mo-Zn-W-Ni | 1:2:3:0.8:0.2 | 95.0 | 96.2 | 83.0 | 82.1 |
| 53 | Bi-Mo-Zn-W-Cr | 1:2:3:0.8:0.2 | 94.5 | 96.1 | 82.5 | 83.5 |
| 54 | Bi-Mo-Ca-W-Cr | 1:2:3:0.8:0.2 | 95.1 | 96.3 | 82.2 | 89.1 |
| 54-1 | Bi-Mo-Ba-W-Cr | 1:2:3:0.8:0.2 | 93.4 | 94.6 | 83.8 | 86.4 |
| 54-2 | Bi-Mo-Mg-W-Cr | 1:2:3:0.8:0.2 | 92.3 | 95.0 | 84.5 | 87.2 |
| 54-3 | Bi-Mo-Cd-W-Cr | 1:2:3:0.8:0.2 | 95.4 | 96.0 | 82.1 | 84.5 |
| 55 | Bi-Mo-Zn-W-Nb | 1:2:3:0.8:0.2 | 94.2 | 94.6 | 85.5 | 87.9 |
| 55-1 | Bi-Mo-Ca-W-Ti-Co-Fe | 1:7:0.2:0.3:0.2:3.5:0.7 | 94.1 | 95.2 | 84.6 | 85.3 |
| Comparative 2 | Bi-Mo-Sb | 1:1.35:3.55 | 36.5 | 65.2 | 23.0 | 79.2 |

EXAMPLE 56

Bi-Mo-Zn-W catalyst 90.6 g of ammonium paratungstate [$(NH_4)_{10}W_{12}O_{41} \cdot 5H_2O$] and 309 g of zinc nitrate [$Zn(NO_3)_2 \cdot 6H_2O$] were dissolved in 1 l of water maintained at 60°C, while being stirred. To this solution, were added, by drops at the same time, a solution of 168.2 g bismuth nitrate [$Bi(NO_3)_3 \cdot 5H_2O$] in 202 ml of a 10 percent nitric acid and a solution of 122.6 g ammonium molybdate [$(NH_4)_6Mo_7O_{24} \cdot 4H_2O$] in 267 ml of a 10 percent aqueous ammonia. Successively, a 10 percent aqueous ammonia was added to the reaction mixture thereby adjusting the pH to 4.0 to form a precipitate. After leaving overnight, the precipitate was washed by four decantations, filtered and dried. The produce was shaped into tablets having a diameter of 5 mm, and then calcined at 600°C for 16 hours to prepare a catalyst.

8 ml of the catalyst, so prepared, was packed into a U-shaped glass reaction tube having an inner diameter of 10 mm. A gaseous mixture of n-butene-1, air and steam, the molar ratio of the three components being 1 : 10 : 4, respectively, was passed through the catalyst-packed reaction tube maintained at 430°C at a flow rate of 150 ml/min. The contact time was 3.2 seconds. The results are shown in Table VI.

EXAMPLE 57

Bi-Mo-Ca-W catalyst

The procedure for the preparation of catalyst of Example 56 was followed wherein 245.6 g of calcium nitrate [Ca(NO$_3$)$_2$.4H$_2$O] was used in substitution for 309 g of zinc nitrate [Zn(NO$_3$)$_2$.6H$_2$O] with all other conditions remaining substantially the same.

Using the catalyst so prepared, the oxidation of n-butene-1 was performed under the same conditions as those in Example 56. The results are shown in Table VI.

EXAMPLE 58

Bi-Mo-Ca-W-Nb catalyst

Using the catalyst prepared in Example 19, the oxidation of n-butene-1 was performed under the same conditions as those in Example 56 except for the reaction temperature being 400°C. The results are shown in Table VI.

EXAMPLE 59

Bi-Mo-Ca-W-Ti catalyst

Using the catalyst prepared in Example 32, the oxidation of n-butene-1 was performed under the same conditions as those in Example 58. The results are shown in Table VI.

Table VI

| Example No. | Catalyst | Atomic ratio | Conversion of n-butene (%) | Selectivity of 1,3-butadiene (%) |
| --- | --- | --- | --- | --- |
| 56 | Bi-Mo-Zn-W | 1:2:3:1 | 89.6 | 84.6 |
| 57 | Bi-Mo-Ca-W | 1:2:3:1 | 88.3 | 83.4 |
| 58 | Bi-Mo-Ca-W-Nb | 1:2:3:0.8:0.2 | 95.6 | 85.2 |
| 59 | Bi-Mo-Ca-W-Ti | 1:2:3:0.8:0.2 | 97.3 | 82.4 |

What is claimed is:

1. A process for simultaneously manufacturing 1,3-butadiene and methacrylonitrile from a hydrocarbon mixture consisting essentially of n-butene and isobutene, said hydrocarbon mixture predominantly containing the n-butene and isobutene which process comprises contacting in the vapor phase at an elevated temperature of 300°–550°C, a mixture of said hydrocarbon mixture, oxygen and ammonia with a catalyst consisting of an oxide composition containing the elements according to the formula, $$BiMo_aII_bW_cX_dO_e$$

wherein II is at least one element selected from metals of Group II of the Periodic Table; X is a metal selected from the group consisting of manganese, chromium, titanium, niobium, tantalum, iron, cobalt and nickel or is a three metal combination of titanium, cobalt and iron; and each of the subscripts a, b, c and d denotes the atomic ratio of the respective metal to bismuth and falling within the following ranges; $a = 0.1$ to $10.0$, $b = 0.05$ to $6.0$, $c = 0.05$ to $3.0$ and $d = 0$ to $5.0$, and $e$ is a value corresponding to the oxides formed from the above components by combination and is a number which satisfies the average valency of the metals employed, said catalyst being a mixture of the metal oxides or in bonded state and being produced by intimately mixing at least one compound selected from the group consisting of the salts, the oxides and mixtures thereof of each of respective elements in an aqueous system, heating to dryness, and then subsequently calcining at a considerably higher temperature.

2. A process according to claim 1, wherein said hydrocarbon mixture has a molar ratio of oxygen to the total of n-butene and isobutene in the hydrocarbon mixture in the range of 0.4 : 1 to 5 : 1 and a molar ratio of ammonia to isobutene in the hydrocarbon mixture in the range of 0.5 : 1 to 3 : 1.

3. A process according to claim 1, wherein said hydrocarbon mixture further contains at least 0.5 mole of steam per mole of the total of n-butene and isobutene contained in the hydrocarbon mixture.

4. A process according to claim 1, wherein said mixture is contacted with said catalyst for a period of 0.3 to 20 seconds.

5. A process according to claim 1 wherein said hydrocarbon mixture is a spent fraction prepared by extracting 1,3-butadiene from the C$_4$ fraction of petroleum.

* * * * *